United States Patent
Gai et al.

(10) Patent No.: US 10,254,554 B2
(45) Date of Patent: Apr. 9, 2019

(54) DISPLAY DEVICE AND METHOD FOR USING THE SAME

(71) Applicants: BOE TECHNOLOGY GROUP CO., LTD, Beijing (CN); BEIJING BOE DISPLAY TECHNOLOGY CO., LTD., Beijing (CN)

(72) Inventors: Xin Gai, Beijing (CN); Jie Liu, Beijing (CN); Hui Zheng, Beijing (CN); Dongxi Li, Beijing (CN)

(73) Assignees: BOE TECHNOLOGY GROUP CO., LTD, Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 186 days.

(21) Appl. No.: 15/500,641

(22) PCT Filed: Jul. 1, 2016

(86) PCT No.: PCT/CN2016/088176
§ 371 (c)(1),
(2) Date: Jan. 31, 2017

(87) PCT Pub. No.: WO2017/024907
PCT Pub. Date: Feb. 16, 2017

(65) Prior Publication Data
US 2017/0219837 A1    Aug. 3, 2017

(30) Foreign Application Priority Data
Aug. 12, 2015  (CN) .......................... 2015 1 0493347

(51) Int. Cl.
*G02F 1/1333*    (2006.01)
*G02B 27/22*    (2018.01)
(Continued)

(52) U.S. Cl.
CPC ....... *G02B 27/2214* (2013.01); *G02F 1/1347* (2013.01); *G02F 1/133308* (2013.01);
(Continued)

(58) Field of Classification Search
None
See application file for complete search history.

(56) References Cited

U.S. PATENT DOCUMENTS 6,049,424 A *   4/2000   Hamagishi ......... G02B 27/2214
                                                359/464
8,238,024 B2 *  8/2012   Tzschoppe ........... H04N 13/361
                                                359/464
(Continued)

FOREIGN PATENT DOCUMENTS

CN    201083910 Y    7/2008
CN    101995693 A    3/2011
(Continued)

OTHER PUBLICATIONS

The World Intellectual Property Organization (WIPO) International Search Report for PCT/CN2016/088176 dated Sep. 22, 2016 p. 1-15
(Continued)

*Primary Examiner* — James A Dudek
(74) *Attorney, Agent, or Firm* — Westerman, Hattori, Daniels & Adrian, LLP

(57) ABSTRACT

A display device and a method for using the display device are provided. The display device includes a display panel, a grating panel over the display panel, and a distance adjusting mechanism for adjusting a distance between the display panel and the grating panel to provide an adjustable optimum viewing distance of the display device. The distance adjusting mechanism includes a first electromagnetic unit configured with the grating panel and a second electromagnetic unit configured under the display panel. Electric cur-
(Continued)

rent flowing through each of the first electromagnetic unit and the second electromagnetic unit is controlled to allow the grating panel to move towards or away from the display panel.

20 Claims, 5 Drawing Sheets

(51) Int. Cl.
G02F 1/1347 (2006.01)
H02K 41/035 (2006.01)
(52) U.S. Cl.
CPC .............. *H02K 41/0356* (2013.01); *G02F 2001/133322* (2013.01)

(56) References Cited

U.S. PATENT DOCUMENTS

| | | | | |
|---|---|---|---|---|
| 9,720,247 | B2* | 8/2017 | Zhou | G02B 26/004 |
| 2002/0036825 | A1* | 3/2002 | Lipton | G02B 27/2214 |
| | | | | 359/463 |
| 2003/0081163 | A1* | 5/2003 | Suzuki | G02F 1/134363 |
| | | | | 349/139 |
| 2004/0139635 | A1* | 7/2004 | McKinley | G02B 27/2214 |
| | | | | 40/454 |
| 2005/0264881 | A1* | 12/2005 | Takagi | H04N 13/305 |
| | | | | 359/463 |
| 2006/0119766 | A1* | 6/2006 | Mi | G02B 27/286 |
| | | | | 349/96 |
| 2006/0192908 | A1* | 8/2006 | Tzschoppe | H04N 13/361 |
| | | | | 349/104 |
| 2007/0229495 | A1* | 10/2007 | Ito | G09G 3/003 |
| | | | | 345/419 |
| 2011/0051239 | A1* | 3/2011 | Daiku | G02B 27/0093 |
| | | | | 359/464 |
| 2012/0162201 | A1* | 6/2012 | Choi | H04N 13/356 |
| | | | | 345/419 |
| 2012/0182407 | A1* | 7/2012 | Yoshida | G02B 27/2214 |
| | | | | 348/54 |
| 2012/0188230 | A1* | 7/2012 | Li | G02B 27/2264 |
| | | | | 345/419 |
| 2012/0299808 | A1* | 11/2012 | Lee | G02B 5/32 |
| | | | | 345/102 |
| 2013/0050596 | A1* | 2/2013 | Chen | G02F 1/1323 |
| | | | | 349/15 |
| 2013/0076724 | A1* | 3/2013 | Park | G02B 27/2264 |
| | | | | 345/212 |
| 2013/0120535 | A1* | 5/2013 | Cha | H04N 13/117 |
| | | | | 348/46 |
| 2013/0141674 | A1* | 6/2013 | Kobayashi | G02F 1/13362 |
| | | | | 349/96 |
| 2013/0147930 | A1* | 6/2013 | Hirai | H04N 13/31 |
| | | | | 348/54 |
| 2013/0169529 | A1* | 7/2013 | Ek | G02B 27/0093 |
| | | | | 345/156 |
| 2013/0187961 | A1* | 7/2013 | Hunt | G02B 27/0093 |
| | | | | 345/697 |
| 2014/0063367 | A1* | 3/2014 | Yang | G02F 1/1335 |
| | | | | 349/12 |
| 2014/0313298 | A1* | 10/2014 | Usukura | G03B 35/24 |
| | | | | 348/59 |
| 2016/0041383 | A1* | 2/2016 | Wang | G02B 3/14 |
| | | | | 359/463 |
| 2016/0345002 | A1* | 11/2016 | Wu | G02B 26/004 |

FOREIGN PATENT DOCUMENTS

| | | |
|---|---|---|
| CN | 102116936 A | 7/2011 |
| CN | 102122074 A | 7/2011 |
| CN | 102455516 A | 5/2012 |
| CN | 103913847 A | 7/2014 |
| CN | 105093544 A | 11/2015 |

OTHER PUBLICATIONS

State Intellectual Property Office of the P.R.C (SIPO) Office Action 1 for 201510493347.9 dated Dec. 29, 2016 p. 1-6.

* cited by examiner

DISPLAY DEVICE AND METHOD FOR USING THE SAME

CROSS-REFERENCES TO RELATED APPLICATIONS

This PCT patent application is a national phase entry under 35 U.S.C. § 371 of International Application No. PCT/CN2016/088176, filed on Jul. 1, 2016, which claims priority of Chinese Patent Application No. 201510493347.9, filed on Aug. 12, 2015 The above enumerated patent applications are incorporated by reference herein in their entirety.

TECHNICAL FIELD

The present disclosure generally relates to the display technologies and, more particularly, relates to a display device and a method for using the display device.

BACKGROUND

A conventional three-dimensional (3D) display device often includes a glass spacer bonded between a display panel and a grating panel. The glass spacer may require a certain thickness and the bonded 3D display device may be heavyweight, bulky, and hard to transport.

During the bonding process, optical adhesives need to be coated and solidified on the glass spacer. The coating and solidifying of the optical adhesives can cause sealing defects, e.g., macular coating defects and display moiré pattern defects, on the edges of the bonded display device.

Once the thickness of the glass spacer is determined, the distance between the display panel and the grating panel may be fixed and unchangeable. Accordingly, the optimum viewing distance is fixed and unchangeable. To obtain the optimum display effects, the viewer has to view the displayed images only at a spot having the optimal, fixed viewing distance without any viewing flexibility.

BRIEF SUMMARY

The present disclosure provides a display device and a method for using the display device. When using the disclosed display device, an adjustable, optimum viewing distance of the display device may be provided.

One aspect of the present disclosure provides a display device. The display device includes a display panel; a grating panel over the display panel; and a distance adjusting mechanism for adjusting a distance between the display panel and the grating panel to provide an adjustable optimum viewing distance of the display device.

Optionally, the distance adjusting mechanism includes: a first electromagnetic unit configured with the grating panel, and a second electromagnetic unit configured under the display panel. The first electromagnetic unit and the second electromagnetic unit are configured to move the grating panel towards and away from the display panel.

Optionally, the first electromagnetic unit configured with the grating panel is placed on one or more surfaces of the grating panel or is at least partially embedded into the one or more surfaces of the grating panel.

Optionally, the first electromagnetic unit configured with the grating panel is wholly embedded within the grating panel.

Optionally, the first electromagnetic unit includes at least one first electromagnetic coil, the second electromagnetic unit includes at least one second electromagnetic coil, and the at least one first electromagnetic coil is aligned with the at least one second electromagnetic coil in a direction perpendicular to the display panel.

Optionally, the first electromagnetic coil includes multiple layers of coil material arranged along a direction perpendicular to a surface of the grating panel, each layer of coil material in the first electromagnetic coil includes a head-end, a tail-end, and a gap between the head-end and the tail-end, gaps formed by the multiple layers in the first electromagnetic coil are arranged in a staggered configuration, and a head-end of one layer of coil material is electrically connected to a tail-end of an adjacent layer of coil material through a contact via.

Optionally, the display device further includes a backboard. The display panel is configured over the backboard, and the second electromagnetic unit is configured on a surface of the backboard or at least partially embedded in the backboard.

Optionally, the at least one first electromagnetic coil in the first electromagnetic unit is distributed at a peripheral region of the grating panel and the at least one second electromagnetic coil in the second electromagnetic unit is distributed at a peripheral region of the backboard, and each of the peripheral region of the grating panel and the peripheral region of the backboard corresponds to a peripheral region of the display panel.

Optionally, the at least one first electromagnetic coil in the first electromagnetic unit is distributed at a central region of the grating panel and the at least one second electromagnetic coil in the second electromagnetic unit is distributed at a central region of the backboard, and each of the central region of the grating panel and the central region of the backboard corresponds to an active area of the display panel.

Optionally, a first portion of the at least one first electromagnetic coil is distributed at a peripheral region of the grating panel and a second portion of the at least one first electromagnetic coil is distributed at a central region of the grating panel, and a first portion of the at least one second electromagnetic coil is distributed at a peripheral region of the backboard and a second portion of the at least one second electromagnetic coil is distributed at a central region of the backboard.

Optionally, the first electromagnetic unit and the second electromagnetic unit have a same configuration.

Optionally, the at least one second electromagnetic coil and the at least one first electromagnetic coil have a same configuration.

Optionally, the display device further includes a frame containing the backboard, the display panel, and the grating panel. The frame has inner sidewalls configured with tracks, and the grating panel contains sliding parts corresponding to the tracks, such that the sliding parts slide along the tracks in the direction perpendicular to the display panel for the grating panel to move towards or away from the display panel.

Optionally, the display device further includes at least one stretchable part. One end of the stretchable part is fixed on the backboard and another end of the stretchable part is connected to the grating panel, the stretchable part stretching along the direction perpendicular to the display panel for the grating panel to move towards or away from the display panel.

Optionally, the grating panel is a liquid crystal switching panel. The grating panel includes a first glass substrate, a second glass substrate, and a liquid crystal layer between the first and second glass substrates. A first electrode layer is on a side of the first glass substrate, a second electrode layer is on a side of the second glass substrate. The first electrode layer and the second electrode layer each includes a plurality of stripe-shaped electrodes uniformly distributed on the first electrode layer and the second electrode layer, respectively. The stripe-shaped electrodes in the first electrode layer are aligned corresponding to the stripe-shaped electrodes in the second electrode layer.

Another aspect of the present disclosure provides a method of using a display device. The display device includes a display panel, a grating panel over the display panel, and a distance adjusting mechanism including a first electromagnetic unit configured with the grating panel and a second electromagnetic unit configured under the display panel. A first electric current flowing through the first electromagnetic unit and a second electric current flowing through the second electromagnetic unit are controlled to allow the grating panel to move towards or away from the display panel and provide an adjustable optimum viewing distance there-between.

Optionally, a magnetic force generated between the first electromagnetic unit and the second electromagnetic unit is controlled by controlling one or more of a current amount, a current intensity, and a current direction of each of the first electric current and the second electric current. When the first electric current and the second electric current have a same current direction, the grating panel moves towards the display panel. When the first electric current and the second electric current have opposite current directions, the grating panel moves away from the display panel.

Optionally, each of the first electromagnetic unit and the second electromagnetic unit is configured in a region corresponding to one or more of a peripheral region and a central region of the display panel.

Optionally, the display device further includes a frame containing the display panel and the grating panel. The frame has inner sidewalls configured with tracks, and the grating panel contains sliding parts corresponding to the tracks, such that the sliding parts slide along the tracks in a direction perpendicular to the display panel for the grating panel to move towards or away from the display panel.

Optionally, each of the first electromagnetic unit and the second electromagnetic unit includes at least one electromagnetic coil. Each electromagnetic coil includes multiple layers of coil material arranged along a direction perpendicular to the display panel. Each layer of coil material in each electromagnetic coil includes a head-end, a tail-end, and a gap between the head-end and the tail-end. Gaps formed by the multiple layers in each electromagnetic coil are arranged in a staggered configuration. A head-end of one layer of coil material is electrically connected to a tail-end of an adjacent layer of coil material in each electromagnetic coil through a contact via.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Figure 1:
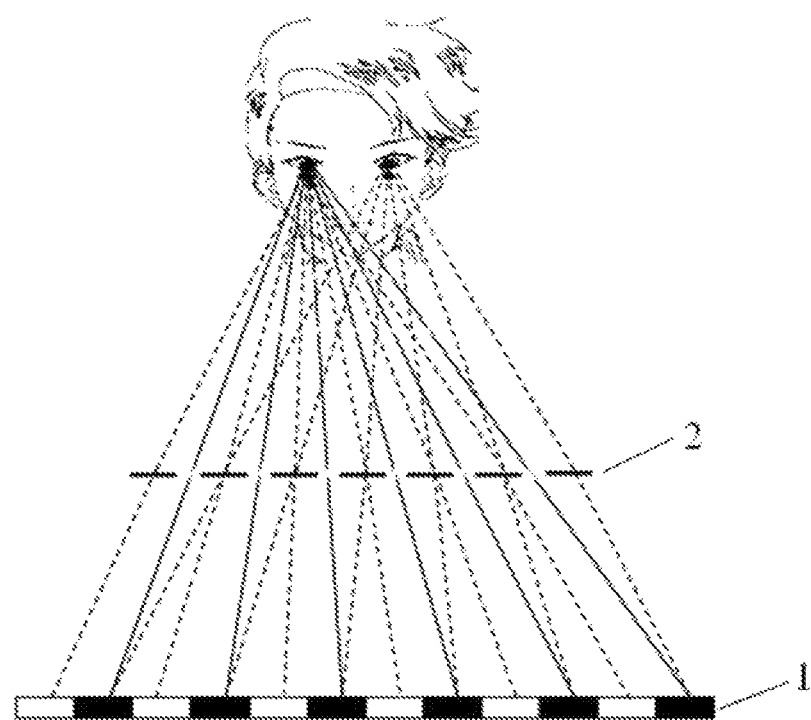
FIG. 1 illustrates working principle of three-dimensional technology for naked eyes.

Three-dimensional (3D) technology for naked eyes, as illustrated in FIG. 1, utilizes a grating panel 2 positioned in the peripheral region of a display panel 1 to implement three-dimensional displays. The display panel 1 is also referred as a base panel, and the grating panel 2 is also referred as an active barrier panel. When the images for the left eye are displayed to a viewer, the opaque stripes or patterns in the grating panel 2 would block the light from exiting to the right eye of the viewer. Similarly, when the images for the right eye are displayed to the viewer, the opaque stripes of patterns in the grating panel 2 would block the light from exiting to the left eye of the viewer. In this way, the visualized images for the left eye and for the right eye of a viewer can be separated. The viewer can thus see three-dimensional images.

Figure 2:
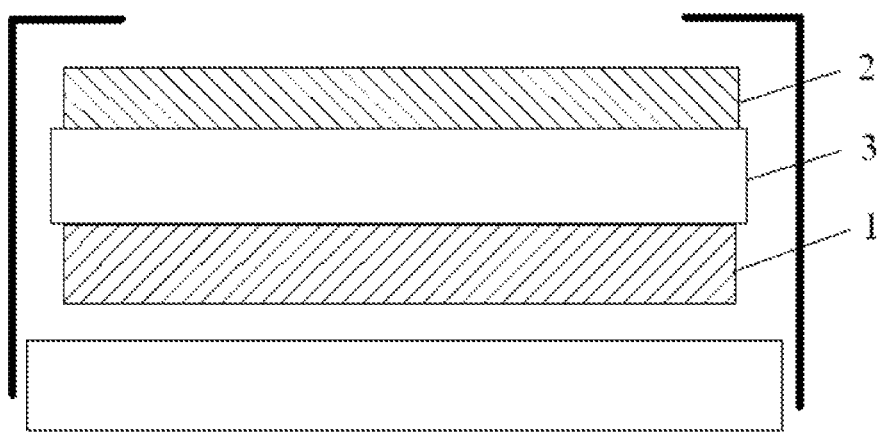
FIG. 2 illustrates a conventional display device for three-dimensional display.

FIG. 2 illustrates a conventional three-dimensional display device. A glass spacer 3 is disposed between a display panel 1 and a grating panel 2. The glass spacer 3 is bonded or otherwise glued between the display panel 1 and the grating panel 2 using optical adhesives. The glass spacer 3 separates the display panel 1 and the grating panel 2 by a desired distance so that three-dimensional images can be displayed to naked eyes.

As disclosed herein, a display device that does not include any glass spacer, and method for using such display device are provided.

For example, a display device may include one or more of a backboard, a display panel, a grating panel, a distance adjusting mechanism, a frame, and at least one stretchable part.

In one embodiment, the display panel may be configured over the backboard. The grating panel may be configured over the display panel. The distance adjusting mechanism may be configured for adjusting a distance between the display panel and the grating panel to provide an adjustable optimum viewing distance of the display device.

The frame may be configured to contain the backboard, the display panel, and the grating panel. For example, the frame may have opposing inner sidewalls configured with tracks. Correspondingly, the grating panel may contain sliding parts according to the tracks, such that the sliding pans may slide along the tracks in a direction perpendicular to the display panel, such as a vertical direction, for the grating panel to move towards or away from the display panel.

In one embodiment, one end of the stretchable part may be fixed on the backboard and another end of the stretchable part may be connected to the grating panel. The stretchable part may thus stretch along a direction perpendicular to the display panel for the grating panel to move towards or away from the display panel.

In one embodiment, the distance adjusting mechanism may include a first electromagnetic unit configured on one or more surfaces of the grating panel, and a second electromagnetic unit configured under the display panel. Such configuration may allow the grating panel to be able to adjustably move towards or away from the display panel, in response to an electric current flowing through the first electromagnetic unit and the second electromagnetic unit.

In one embodiment, the first electromagnetic unit may be configured on surface(s) of the grating panel or at least partially (e.g., sometimes wholly) embedded into the grating panel. The second electromagnetic unit may be configured on a surface of the backboard or at least partially (e.g., sometimes wholly) embedded into the backboard.

In one embodiment, the first electromagnetic unit may include at least one first electromagnetic coil. The second electromagnetic unit may include at least one second electromagnetic coil. The at least one first electromagnetic coil may be aligned with the at least one second electromagnetic coil in a direction perpendicular to the display panel.

In one embodiment, the first electromagnetic coil may include multiple layers of coil material arranged along a direction perpendicular to a surface of the grating panel. Each layer of coil material in the first electromagnetic coil may include a head-end, a tail-end, and a gap between the head-end and the tail-end. Gaps of the layers of coil material in the first electromagnetic coil may be arranged in a staggered configuration. A bead-end of one layer, such as a lower layer, in the first electromagnetic coil may be electrically connected to a tail-end of an adjacent layer, such as a higher layer of coil material, through a contact via.

In one embodiment, the first electromagnetic unit may be configured on one of opposite surfaces of the grating panel. For example, one of the opposite surfaces of the grating panel may face the display panel, while the other of the opposite surfaces of the grating panel may be away from the display panel. Likewise, the second electromagnetic unit may be configured on one of opposite surfaces of the backboard that faces or is away from the display panel.

In one embodiment, the at least one first electromagnetic coil may be distributed at a peripheral region of the grating panel and the at least one second electromagnetic coil may be distributed at a peripheral region of the backboard. Each of the peripheral region of the grating panel and the peripheral region of the backboard corresponds to a peripheral region of the display panel.

Optionally, the at least one first electromagnetic coil may be distributed at a central region of the grating panel and the at least one second electromagnetic coil may be distributed at a central region of the backboard. Each of the central region of the grating panel and the central region of the backboard may correspond to an active area of the display panel.

Optionally, a first portion of the at least one first electromagnetic coil may be distributed at the peripheral region of the grating panel and a second portion of the at least one first electromagnetic coil may be distributed at the central region of the grating panel. A first portion of the at least one second electromagnetic coil may be distributed at the peripheral region of the backboard and a second portion of the at least one second electromagnetic coil may be distributed at the central region of the backboard.

Optionally, the first electromagnetic unit and the second electromagnetic unit may have a same configuration. Optionally, the at least one second electromagnetic coil and the at least one first electromagnetic coil have a same configuration. Optionally, the at least one second electromagnetic coil may be disposed in grooves in the backboard such that the at least one second electromagnetic coil may be partially or wholly embedded in the backboard.

In one embodiment, the second electromagnetic coil may include multiple layers of coil material arranged along a direction perpendicular to a surface of the grating panel. Each coil may include a head-end, a tail-end, and a gap between the head-end and the tail-end. Gaps formed by the multiple layers of coil material are arranged in a staggered configuration, and a head-end of one layer, such as a lower layer, of coil material may be electrically connected to a tail-end of an adjacent layer such as a higher layer of coil material in the second electromagnetic coil through a contact via.

In one embodiment, the grating panel may be a liquid crystal switching panel, e.g., in an LCD display device. The grating panel may include: a first glass substrate, such as an upper glass substrate, a second glass substrate, such as a lower glass substrate, and a liquid crystal layer between the first and second glass substrates. A first electrode layer may be formed on a side of the upper glass substrate facing the liquid crystal layer. A second electrode layer may be formed on a side of the lower glass substrate facing the liquid crystal layer. The first electrode layer and the second electrode layer may each include a plurality of stripe-shaped electrodes uniformly distributed on the first electrode layer and the second electrode layer, respectively. The stripe-shaped electrodes in the first electrode layer are aligned corresponding to the stripe-shaped electrodes in the second electrode layer.

Various embodiments also provide an exemplary method for using the disclosed display device having the first electromagnetic unit and the second electromagnetic unit. In this method, for example, a first electric current flowing through the first electromagnetic unit and a second electric current flowing through the second electromagnetic unit may be controlled, to allow the grating panel to move towards or away from the display panel and provide an adjustable optimum viewing distance there-between.

Optionally, the first electric current flowing through the first electromagnetic unit and the second electric current flowing through the second electromagnetic unit may be controlled by controlling a magnetic force generated between the first electromagnetic unit and the second electromagnetic unit, when controlling one or more of a current amount, a current intensity, and a current direction of each of the first electric current and the second electric current.

For example, when the first electric current and the second electric current have a same current direction, the grating panel may be controlled to move towards the display panel. When the first electric current and the second electric current have opposite current directions, the grating panel may be controlled to move away from the display panel.

Figure 3:
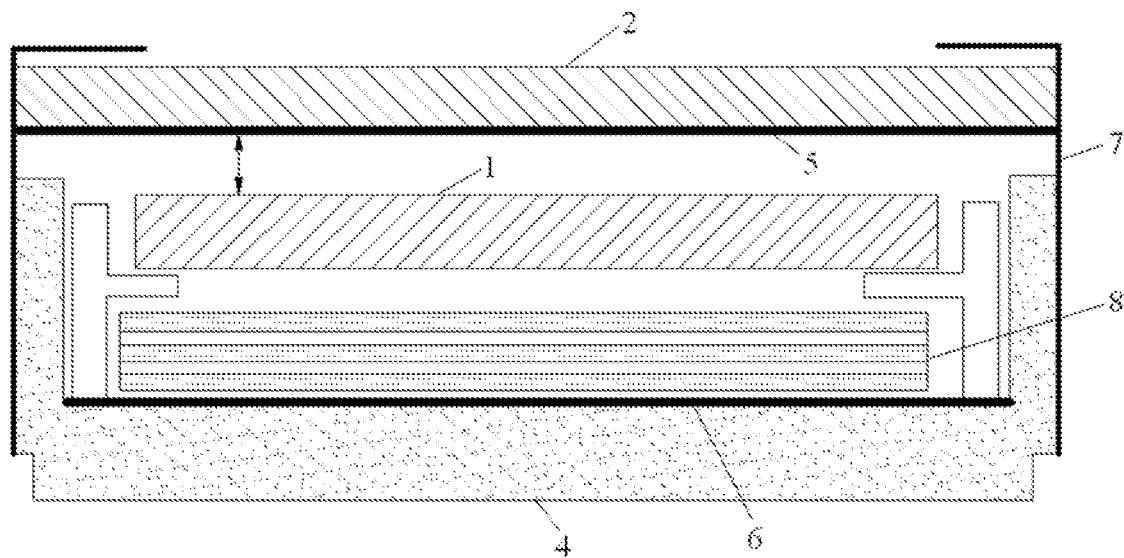
FIG. 3 illustrates an exemplary display device according to various disclosed embodiments of the present disclosure.

FIG. 3 illustrates an exemplary display device according to various embodiments of present disclosure. The exemplary display device may include a display panel 1 configured over or within a backboard 4, and a grating panel 2 configured over the backboard 4. The display device may also include a distance adjusting mechanism configured to adjust a distance between the display panel 1 and the grating panel 2.

The distance adjusting mechanism may be configured to increase or decrease the distance between the grating panel 2 and the display panel 1 and to thus provide adjustable optimum viewing distance for 3D display. The viewer or user can change the distance for viewing as desired. Optimum picture effect can be seen or viewed by adjusting the distance between the grating panel 2 and the display panel 1, which can enhance the visual experience of the viewer.

Further, as shown in FIG. 3, the distance adjusting mechanism includes a first electromagnetic unit 5 configured on the grating panel 2, e.g., facing the display panel 1, and a second electromagnetic unit 6 configured on a bottom surface of the backboard 4 and under the display panel 1. The first electromagnetic unit 5 and the second electromagnetic unit 6 may magnetically attract or repel each other. The attraction and the repulsion can move the grating panel 2 toward or away from the display panel 1.

In some embodiments, the first electromagnetic unit includes at least one first electromagnetic coil and the second electromagnetic unit may include at least one second electromagnetic coil. The directions of electric current flowing through the first electromagnetic coil and the second electromagnetic coil may be same such that the grating panel moves towards the display panel. The directions of electric current flowing through the first electromagnetic coil and the second electromagnetic coil may be opposite such that the grating panel moves away from the display panel.

Figure 4:
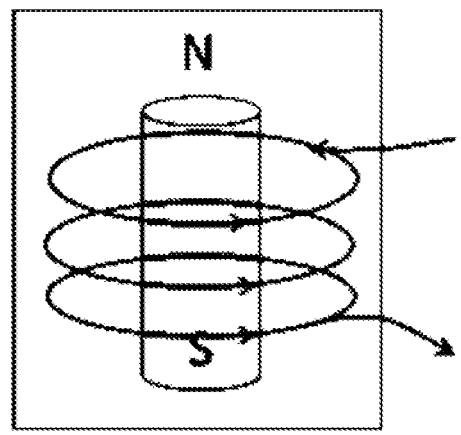
FIG. 4 illustrates a right hand rule for electromagnetic coils.

The interaction between the first electromagnetic unit 5 and the second electromagnetic unit 6 may follow the Principles of Electromagnetic Induction. That is, the magnetic field may be generated around the electrically-charged coils, and the direction of the magnetic field follows the right hand rule, as shown in FIG. 4. By setting up the directions of the current that flows through the first electromagnetic unit 5 and the second electromagnetic unit 6, magnetic force can be generated between the first electromagnetic unit 5 and the second electromagnetic unit 6 to either attract or repel each other. Such magnetic force may enable the grating panel 2 to move towards or away from the display panel 1 as desired. Further, by adjusting the current amount and/or current intensities flowing through the first electromagnetic unit 5 and the second electromagnetic unit 6, the magnetic force generated between the first electromagnetic unit 5 and the second electromagnetic unit 6 can be regulated. Thus, the relative moving distance between the grating panel 2 and the display panel 1 can be accurately adjusted.

Compared with conventional technologies, no glass spacer is needed as disclosed herein. The weight of the entire device can be reduced and screen transmission rate can be improved. In addition, sealing defects caused by bonding the glass spacer with each of the display panel and the grating panel can thus be avoided. Product yield can be improved.

In some embodiments, the first electromagnetic unit 5 may contain at least one first electromagnetic coil, and the second electromagnetic unit 6 may contain at least one second electromagnetic coil. The grating panel 2 can be configured to move towards or away from the display panel 1, depending on the directions, i.e., same directions or opposite directions, of the current flowing in the first electromagnetic coil and the second electromagnetic coil.

As disclosed herein, specific positioning of each of the first electromagnetic coil and the second electromagnetic coil is not limited. It is only required that normal display is not affected, and attractive or repulsive force can be generated to allow the grating panel 2 to move towards or away from the display panel 1.

In some embodiments, the first electromagnetic coils may be positioned in accordance with the second electromagnetic coil to enhance the attractive or repulsive effect between the two, and to increase the accuracy of adjustment at the same time. For example, the first electromagnetic coils may be aligned with the second electromagnetic coils, and/or the first electromagnetic coils may be positioned facing the second electromagnetic coils.

In the present disclosure, the first electromagnetic unit 5 can be arranged on one side of the grating panel 1. For example, the first electromagnetic unit 5 can be arranged on a side of the grating panel 1 that faces the display panel 1 or on the other side of the grating panel 1 that is away from the display panel 1. As an example, FIG. 3 illustrates a first electromagnetic unit 5 arranged on a side of the grating panel 2 facing the display panel 1.

Figure 5A:
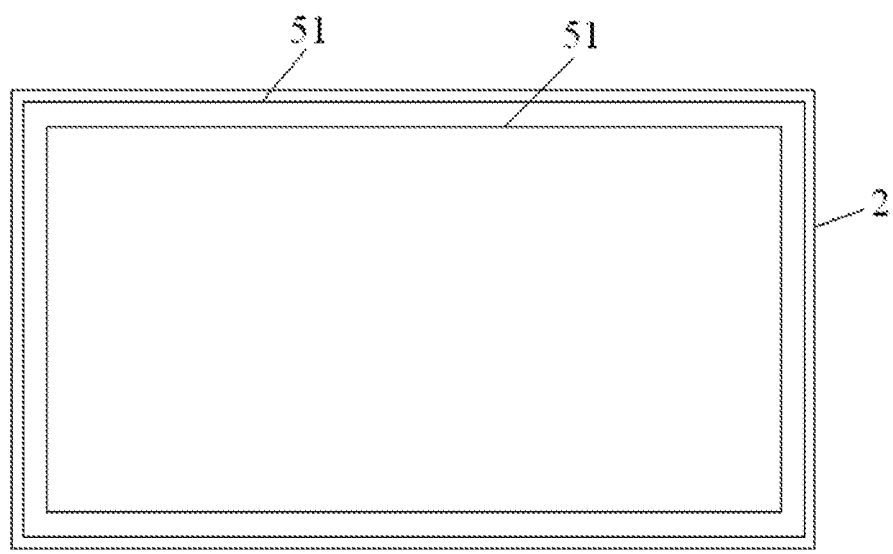
FIGS. 5a-5c illustrate an exemplary configuration of a first electromagnetic unit according to various disclosed embodiments of the present disclosure.
Figure 5B:
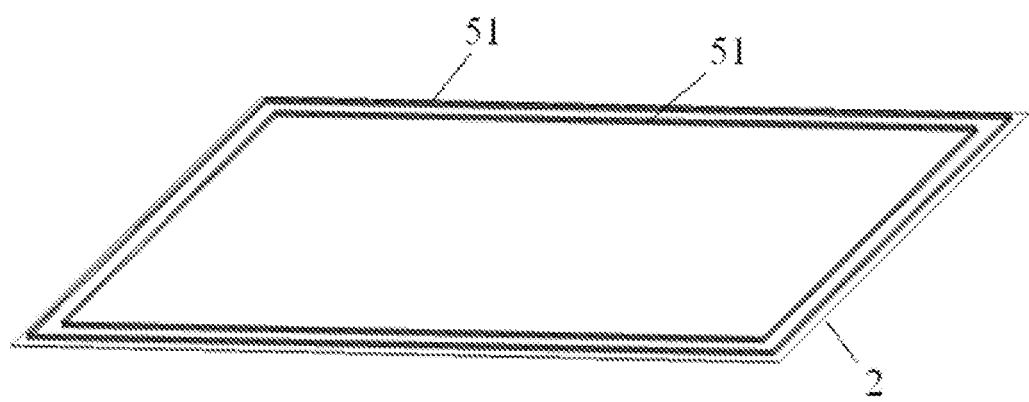
Figure 5C:
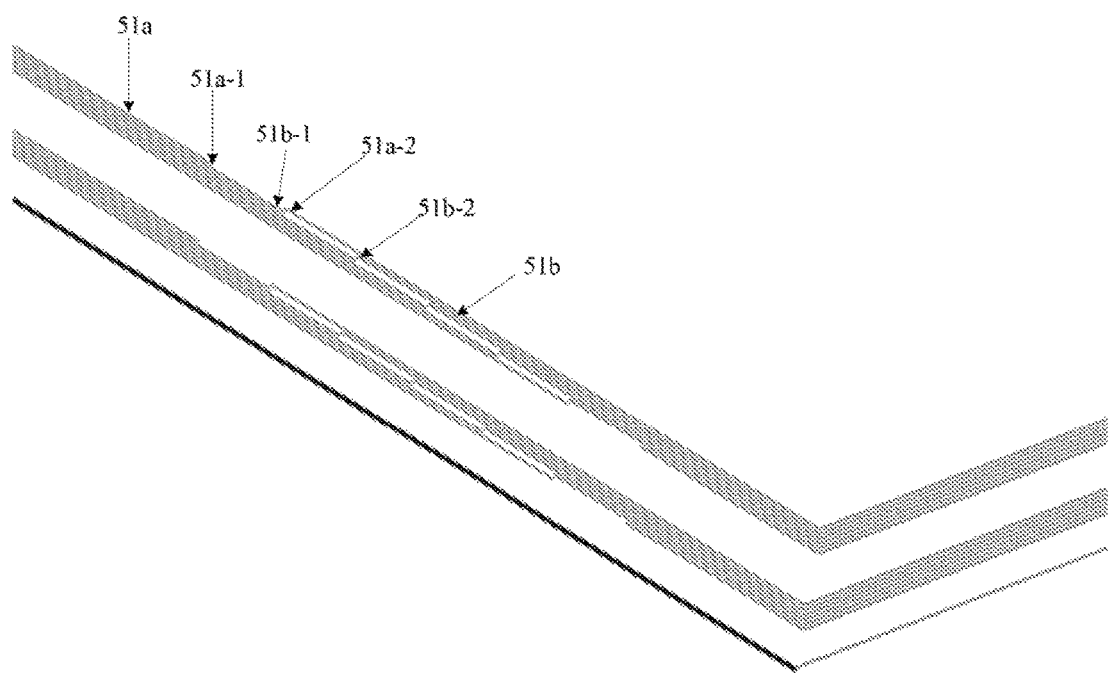

FIGS. 5a-5c illustrate an exemplary first electromagnetic unit in accordance with various disclosed embodiments. Specifically, FIG. 5a illustrates a top view of the exemplary first electromagnetic unit, FIG. 5b illustrates a top perspective view of the exemplary first electromagnetic unit, and FIG. 5c illustrates a close-up view of the exemplary first electromagnetic unit.

The exemplary first electromagnetic unit may include a plurality of first electromagnetic coils 51. The plurality of first electromagnetic coils 51 may be configured on and along an edge of a surface of the grating panel 2.

For example, one first electromagnetic coil 51, as illustrated in FIG. 5b, may be formed by multiple layers 51a and 51b of coil material, as illustrated in FIG. 5c, along a direction perpendicular to the surface of the grating panel 2. For example, the layers of coil material may be formed along a vertical direction, when the grating panel 2 is placed in a horizontal direction. As shown in FIG. 5c, each layer (e.g., 51a and 51b) of coil material in the first electromagnetic coil 51 may not form a closed loop. That is, in each layer of coil material, a head-end may not be connected to the tail-end in the same layer of coil material, and a gap may be formed between the head-end and the tail-end of the same layer of coil material. The gaps in the layers of coil material in a first electromagnetic coil 51 may not be aligned and may form a staggered configuration. For two adjacent layers of coil material in a first electromagnetic coil 51, the tail-end of the higher layer of coil material may be connected to the head-end of a lower layer of coil material through via hole. The via hole may be filled with a suitable material with a sufficiently high electrical conductivity. For example, indium tin oxide (ITO) may be used to fill the via hole for connecting two adjacent layers of coil material. Suitable metal or metal wires may be used to form the coils.

In the disclosure, each of first electromagnetic coil(s) in the first electromagnetic unit and second electromagnetic coil(s) in the second electromagnetic unit may include multiple layers of coil material. Such multiple layers in a same electromagnetic coil are connected together through via holes.

For illustrative purposes, two adjacent layers 51a and 51b of coil material are labeled in FIG. 5c, and correspond to one first electromagnetic coil 51 shown in FIG. 5b to further describe the configuration of the coils. Specifically, the layer 51a may be a higher layer or the layer 51b may be a lower layer. The head-end of the layer 51a is labeled as element 51a-1, and the tail-end of the layer 51a is labeled as element 51a-2. The head-end of the layer 51b is labeled as element 51b-1, and the tail-end of the layer 51b is labeled as element 51b-2.

As shown in FIG. 5c, the head-end 51a-1 may be separated from the tail-end 51a-2 by a gap formed there-between in the layer 51a, and the head-end 51b-1 may be separated from the tail-end 51b-2 by a gap formed there-between in the layer 51b. The gaps formed in each of the layers 51a and 51b may be aligned to provide a staggered configuration. The tail-end 51*a*-2 and the head-end 51*b*-1 may be connected together through via hole (not shown). The via hole may be filled with an electrically conductive material, such as ITO. Other layers of coil material in the first electromagnetic coil 51 may be arranged in similar manners as shown in FIG. 5*c* and the details are not repeated herein.

The layers 51*a* and 51*b* of coil material may be arranged along a direction perpendicular to the surface of the grating panel 2, e.g., the vertical direction, so that the overall elevation of the layer 51*a* may be higher or lower than the overall elevation of the layer 51*b* along the direction perpendicular to the surface of the grating panel 2. For descriptive purposes, the terms "higher" and "lower" may be used to describe relative positions that are farther away from and closer to the surface of the grating panel 2, respectively. That is, the layers of coil material in first electromagnetic coil 51 may each be arranged at a different elevation along the direction perpendicular to the surface of the grating panel 2 so that multiple layers of coil material may be arranged along the direction perpendicular to the surface of the grating panel 2. The end-tail of a higher layer of coil material may be connected to the head-tail of a lower layer of coil material through via hole. In some embodiments, a higher layer of coil material may be arranged at a higher elevation than the adjacent lower layer. In some other embodiments, each higher layer of coil material may be arranged at a lower elevation than the adjacent layer of coil material. In one embodiment, the higher layer, e.g., the layer 51*a*, may be arranged in the highest elevation, and the lower layer, e.g., the layer 51*b*, may be arranged in the lowest elevation.

The terms "higher" and "lower" are for descriptive purposes only and do not indicate any differences in functions, compositions, or operations.

In some embodiments, each coil, such as each first electromagnetic coil 51, may be formed on one side, such as one surface, of the grating panel 2 by a patterning process, e.g., a photolithography process, and followed by a deposition process. A via-hole can be formed between gaps of adjacent layers of coil material to electrically connect adjacent layers of coil material to form the first electromagnetic coil 51.

In various embodiments, the coils, such as each first electromagnetic coils 51, may be formed in the grating panel 2, e.g., being partially or wholly embedded in the grating panel 2 in a direction perpendicular to the surface of the grating panel 2, or may be formed on the surface of the grating panel 2, e.g., being protruded over a surface of the grating panel 2. Any suitable methods to form the coils may also be suitable for the present disclosure. Same or different methods may be used to form coils on the backboard 4.

Specifically, if the coils are formed to be at least partially embedded in the grating panel 2, an etch mask and a suitable etching process may be used to form the grooves for the coils. After the groove are formed, metal, as an example of coil material, may be deposited in the corresponding grooves first to form the lowest layer in the coil. Further, a suitable insulating material may be deposited on the lowest layer of coil material to electrically insulate the lowest layer of coil material from the adjacent coil material of a higher layer. A via hole may be formed between the head-end of the lowest layer and the tail-end of a subsequently-formed higher layer of coil material. A suitable metal may be filled into via hole to form the contact via. Further, the metal for forming the coils may be deposited on the insulating material to form the higher layer of coil material. The process described above may be repeated to form multiple layers of coil material arranged along the direction perpendicular to the surface of the grating panel 2, until the coils are formed. For each layer in the coil, a mask is used for forming the patterns of the coils. A mask may be used to only expose a certain area in a groove for the metal to be deposited on. A same mask may be arranged, e.g., rotated, for forming multiple layers of the coil, or different masks may be used for forming multiple layers of the coil. The metal may be deposited using a suitable deposition method such as sputtering or vapor deposition. The highest layer in each coil may be coplanar with the surface of the grating panel 2, or may be lower or higher than the surface of the grating panel 2.

In some embodiments where the coils, such as the first electromagnetic coils 51, are formed on the grating panel 2, no grooves need to be formed. The formation of the coils may refer to the description of the formation of the coils embedded in the grating panel 2 and is not repeated herein. The thicknesses of the coils and the related insulating material are sufficiently thin and negligible compared to the top surface area of the grating panel 2.

In practice, the specific methods for forming the coils on the grating panel 2 should not be limited according to various embodiments of the present disclosure. It is only required that forces generated between the first electromagnetic coils formed on/in the grating panel 2, i.e., of the first electromagnetic unit 5, and the second electromagnetic coils formed on/in the backboard 4, of the second electromagnetic unit 6, may be used to attract or repel the grating panel 2 to move towards or away from the display panel 1.

Figure 6A:
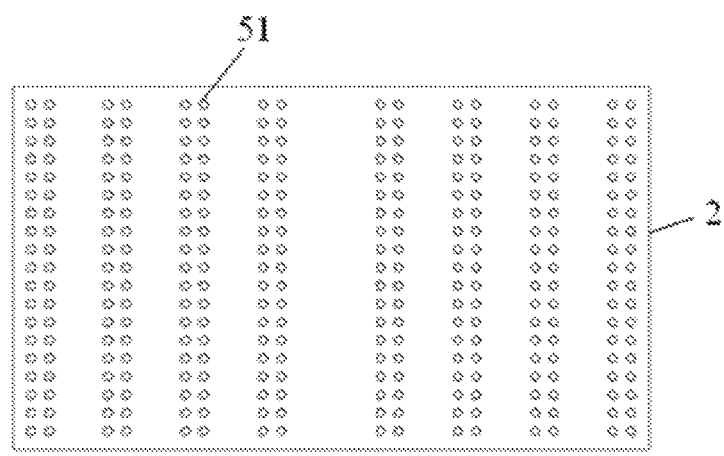
FIGS. 6a-6c illustrate another exemplary configuration of a first electromagnetic unit according to various disclosed embodiments of the present disclosure.
Figure 6B:
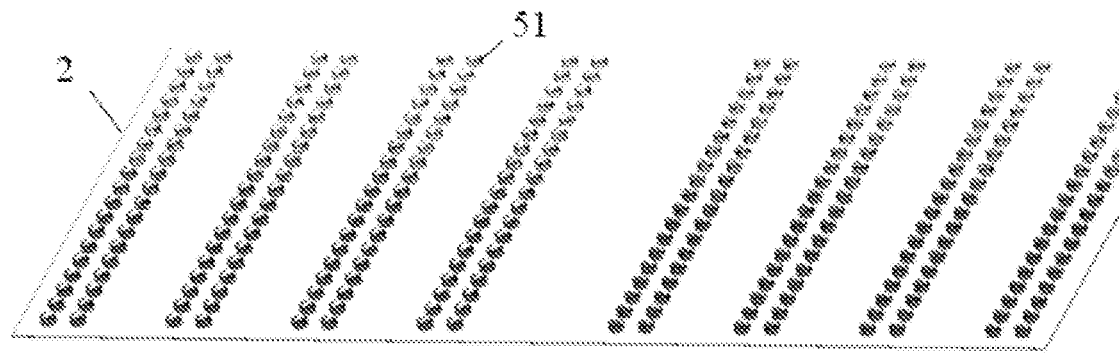
Figure 6C:
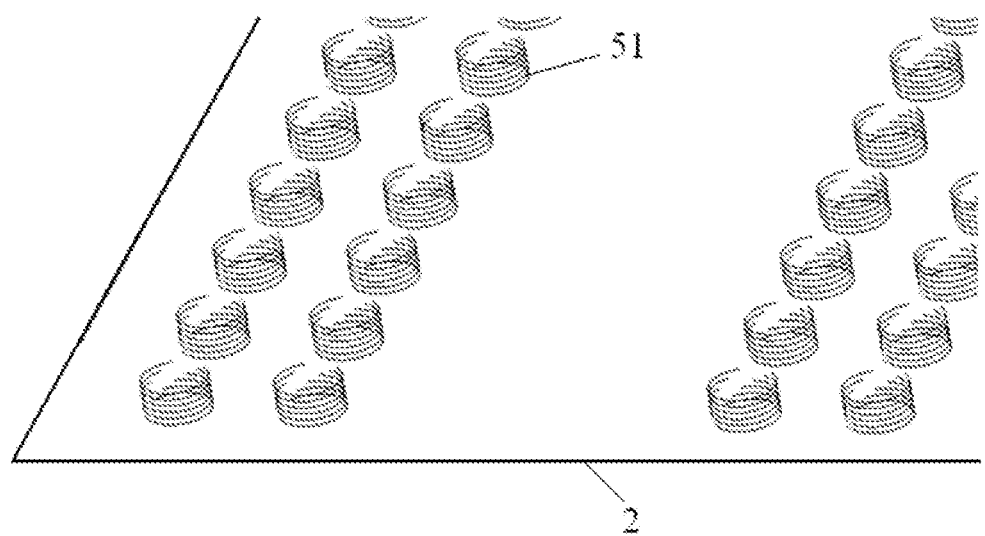

FIGS. 6*a*-6*c* illustrate another exemplary arrangement of the first electromagnetic coils in the first electromagnetic unit in accordance with various disclosed embodiments. Specifically, FIG. 6*a* illustrates a top view of the exemplary first electromagnetic unit, FIG. 6*b* illustrates a top perspective view of the exemplary first electromagnetic unit, and FIG. 6*c* illustrates a close-up view of the exemplary first electromagnetic unit.

As shown in FIGS. 6*a*-6*c*, a plurality of first electromagnetic coils may be formed on/in the grating panel 2. The plurality of the first electromagnetic coils 51 may be arranged as an array on the grating panel 2. In some embodiments, the plurality of the first electromagnetic coils 51 may be arranged in the central region of the grating panel 2.

As illustrated in FIGS. 6*a*-6*c*, a first electromagnetic coil 51 may include a plurality of multiple-layer of coil material arranged along a direction perpendicular to the surface of the grating panel 2. The head-end and the tail-end in a same coil may not be connected such that a gap is formed in each coil. The gaps of the multiple-layers in each coil may be arranged in a staggered configuration. For two adjacent layers in the coil, the head-end of a lower layer may be connected to the tail-end of a higher layer of coil material through a via hole. A material with sufficiently high conductivity may be used to fill in the via hole for forming a contact via. Similar patterning processes, as described in FIGS. 5*a*-5*c*, may be used to form the plurality of first electromagnetic coils 51 on/in one side of the grating panel 2 as described in FIGS. 5*a*-5*c*. Similar patterning processes may also be used to form a plurality of second electromagnetic coils (not shown) on/in on one side of the backboard 4. In some embodiments, the arrangement of the second electromagnetic unit 6 may be the same as the arrangement of the first electromagnetic unit 5.

Compared to the first electromagnetic coils illustrated in FIGS. 5*a*-5*c*, the first electromagnetic coils illustrated in FIGS. 6*a*-6*c* may have smaller dimensions. In some embodiments, different layers, either in a first electromagnetic coil or in a second electromagnetic coil, may have same dimensions or radius.

In another embodiment of the present disclosure, the arrangement of the first electromagnetic coils may be a combination of the arrangements described in FIGS. 5a-5c and FIGS. 6a-6c. That is, some first electromagnetic coils may be arranged on the peripheral region of the grating panel, and some other first electromagnetic coils may be arranged in the central region of the grating panel.

When some first electromagnetic coils are arranged on the peripheral region of the grating panel and some other first electromagnetic coils are arranged in the central region of the grating panel 2, magnetic force may be applied on the peripheral region and the central region of the grating panel 2, and the grating panel 2 may be subjected to a more evenly distributed attraction or repulsion. Thus, the distance between the grating panel 2 and the display panel 1 may be more accurately adjusted.

It should be noted that, the arrangements of the first electromagnetic coils are only exemplary. The first electromagnetic coils may also be arranged using other suitable arrangements.

In some embodiments, when a plurality of first electromagnetic coils 51 are arranged as an array in the central region of the grating panel 2, the locations of the first electromagnetic coils 51 may correspond to the locations of the light-blocking areas of the grating panel 2. That is, each first electromagnetic coil 51 may be at the locations of the light-blocking areas of the grating panel 2 to avoid any adverse effect to the display effect of the display device.

Further, in the display device of the present disclosure, the second electromagnetic unit may be arranged to be on/in one side, e.g., one surface, of the backboard 4 that faces the display panel 1 or on/in an opposite side, e.g., an opposite surface, of the backboard 4 that is away from the display panel 1. For example, as shown in FIG. 3, the second electromagnetic unit 6 may be arranged on/in the side of the backboard 4 that faces the display panel 1.

To improve the attraction or repulsion of the magnetic force, in some embodiments, the arrangement of the second electromagnetic unit may be the same as the arrangement of the first electromagnetic unit.

That is, the second electromagnetic unit may include at least one second electromagnetic coil arranged at the peripheral region of the backboard 4. In some embodiments, the second electromagnetic unit may also include at least one second electromagnetic coil arranged as an array in the central region of the backboard 4. In some other embodiments, some of the second electromagnetic coils may be arranged at the peripheral region of the backboard 4, and some other second electromagnetic coils may be arranged at the central area of the backboard 4.

It should be noted that, in the present disclosure, the peripheral region of the backboard 4/grating panel 2 may correspond to the region on the display panel 1 that is not configured to display images; and the central region of the backboard 4/grating panel 2 may correspond to the region on the display panel 1 that is configured to display images, i.e., active area of the display panel 1.

To improve the adjustment of distance between the display panel 1 and the grating panel 2, in some embodiments, the arrangement of the second electromagnetic coils may be the same as or may correspond to the arrangement of the first electromagnetic coils.

A second electromagnetic coil may also include multiple layers of coil material arranged along a direction perpendicular to the top surface of the backboard 4. The head-end and the tail-end of a coil may not be connected such that a gap is formed in each coil. The gaps formed by the multiple layers of coil material may be arranged in a staggered configuration. For two adjacent layers in a coil, the head-end of a lower layer may be connected to the tail-end of a higher layer of coil material through a via hole. A material with sufficiently high conductivity may be used to fill in the via hole for forming a contact via.

In some embodiments, layers in each coil may be consecutively formed on or in one side, such as a bottom surface, of the backboard 4 through a patterning process and related metal deposition process. A via hole may be formed to connect the head-end of a lower layer of coil material and the tail-end of an adjacent higher layer of coil material so that adjacent coils may be electrically connected. The process may be repeated to form multiple layers of coil material for the second electromagnetic coils. Details of the formation of the second electromagnetic coils may refer to the formation of the first electromagnetic coils described above and are not repeated herein.

In some embodiments, to further reduce the thickness of the display device, trenches or grooves may be formed in the backboard where the second electromagnetic coils are located such that the second electromagnetic coils may be positioned in the trenches or grooves.

In the display device illustrated in FIG. 3, an optical film layer 8 may be positioned between the backboard 4 and the display panel 1. The optical film layer 8 may provide light source for the display device. The display device may also include a frame 7 to contain the backboard 4, the display panel 1, the grating panel 2, the optical film layer 8, and other related components.

The specific ways to enable the relative movement between the grating panel 2 and the display panel 1 should not be limited by the embodiments of the present disclosure. In some embodiments, the grating panel 2 may move with respect to the display panel 1. For example, tracks may be arranged on the two opposing inner sidewalls of the frame 7, where the two inner sidewalls face each other. The tracks may be arranged vertically, e.g., along a direction perpendicular to the surface of the grating panel 2. Sliding parts may be arranged on the grating panel 2, where the positions of the sliding parts may correspond to the tracks so that the sliding parts may move vertically, i.e., upwardly and downwardly, along the tracks. Thus, the grating panel 2 may move towards or away from the display panel 1.

When the magnetic force generated between the first electromagnetic unit 5 and the second electromagnetic unit 6 is attraction force, the sliding parts may move downwardly such that the grating panel 2 may move towards the display panel 1. When the magnetic force generated between the first electromagnetic unit 5 and the second electromagnetic unit 6 is repulsion force, the sliding parts may move upwardly such that the grating panel 2 may move away from the display panel 1.

In some other embodiments, the display device may include at least one stretchable or elastic part. One end of the stretchable part may be fixed on the backboard 4, and the other end of the stretchable part may be connected to the grating panel 2. The stretchable part may stretch along the vertical direction so that the grating panel 2 may move towards or away from the display panel 1.

When the magnetic force generated between the first electromagnetic unit 5 and the second electromagnetic unit 6 is attraction, the stretchable part may contract along the vertical direction such that the grating panel 2 may move towards the display panel 1. When the magnetic force generated between the first electromagnetic unit 5 and the second electromagnetic unit 6 is repulsion, the stretchable part may expand along the vertical direction such that the grating panel 2 may move away from the display panel 1.

In some embodiments, the grating panel described in the present disclosure may be a liquid crystal switching panel. The grating panel may include an upper glass substrate, a lower glass substrate, and a liquid crystal layer disposed between the upper glass substrate and the lower glass substrate. A first electrode layer may be disposed on the side of the upper glass substrate that contacts the liquid crystal layer. A second electrode layer may be disposed on the side of the lower glass substrate that contacts the liquid crystal layer. The first electrode layer and the second electrode layer may each include a plurality of stripe-shaped electrodes. The stripe-shaped electrodes may be uniformly distributed. The locations of the stripe-shaped electrodes in the first electrode layer may correspond to or be aligned with the locations of the stripe-shaped electrodes in the second electrode layer.

When a voltage is applied on the stripe-shaped electrodes in the first electrode layer and the second electrode layer, liquid crystal molecules in the corresponding regions, i.e., regions applied with the voltage, may change alignment to form black screen. Meanwhile, liquid crystal modules in the regions not covered by the stripe-shaped electrodes would not change alignment, and white screen may be formed. The functions of the grating panel may be implemented.

It should be noted that, other suitable panels may also be used to implement the functions of the grating panel, provided that the grating panel has light-blocking functions.

It should be noted that, the current flowing through a first electromagnetic coil or a second electromagnetic coil may be controlled separately or jointly. In some embodiments, the coils may be controlled separately so that the magnetic force generated may be more accurately controlled at different locations between the first electromagnetic unit and the second electromagnetic unit.

In the present disclosure, by implementing a distance adjusting mechanism, the distance between the display panel and the grating panel may be adjusted to increase or decrease. Thus, optimum viewing distance of the three-dimensional display device may be adjusted. For example, a first electromagnetic unit may be disposed on/in the grating panel, and a second electromagnetic unit may be disposed on/in the backboard. By adjusting the intensities and directions of the electric current flowing through the first electromagnetic unit and the second electromagnetic unit, the distance between the display panel and the grating panel may be accurately adjusted. Compared to the conventional technology, no glass spacer is needed in the disclosed display device. The display device may be lighter and less bulky, and the screen transmission rate may be improved.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A display device, comprising:
a display panel;
a grating panel over the display panel; and
a distance adjusting mechanism for adjusting a distance between the display panel and the grating panel to provide an adjustable optimum viewing distance of the display device,
wherein the distance adjusting mechanism includes a first electromagnetic unit configured with the grating panel;
the first electromagnetic unit includes at least one first electromagnetic coil; and
the first electromagnetic coil includes multiple layers of coil material arranged along a direction perpendicular to a surface of the grating panel.

2. The display device according to claim 1, wherein the distance adjusting mechanism further comprises:
a second electromagnetic unit configured under the display panel, and
wherein the first electromagnetic unit and the second electromagnetic unit are configured to move the grating panel towards and away from the display panel.

3. The display device according to claim 2, wherein:
the first electromagnetic unit configured with the grating panel is placed on one or more surfaces of the grating panel or is at least partially embedded into the one or more surfaces of the grating panel.

4. The display device according to claim 2, wherein:
the first electromagnetic unit configured with the grating panel is wholly embedded within the grating panel.

5. The display device according to claim 2, wherein:
the second electromagnetic unit includes at least one second electromagnetic coil, and
the at least one first electromagnetic coil is aligned with the at least one second electromagnetic coil in a direction perpendicular to the display panel.

6. A display device comprising:
a display panel;
a grating panel over the display panel; and
a distance adjusting mechanism for adjusting a distance between the display panel and the grating panel to provide an adjustable optimum viewing distance of the display device, wherein:
the distance adjusting mechanism includes a first electromagnetic unit configured with the grating panel;
the first electromagnetic unit includes at least one first electromagnetic coil; and
the first electromagnetic coil includes multiple layers of coil material arranged along a direction perpendicular to a surface of the grating panel,
each layer of coil material in the first electromagnetic coil includes a head-end, a tail-end, and a gap between the head-end and the tail-end,
gaps formed by the multiple layers in the first electromagnetic coil are arranged in a staggered configuration, and
a head-end of one layer of coil material is electrically connected to a tail-end of an adjacent layer of coil material through a contact via.

7. The display device according to claim 1, further comprising a backboard, wherein:
the display panel is configured over the backboard, and
the second electromagnetic unit is configured on a surface of the backboard or at least partially embedded in the backboard.

8. The display device according to claim 7, wherein:
the at least one first electromagnetic coil in the first electromagnetic unit is distributed at a peripheral region of the grating panel and the at least one second electromagnetic coil in the second electromagnetic unit is distributed at a peripheral region of the backboard, and each of the peripheral region of the grating panel and the peripheral region of the backboard corresponds to a peripheral region of the display panel.

9. The display device according to claim 7, wherein:
the at least one first electromagnetic coil in the first electromagnetic unit is distributed at a central region of the grating panel and the at least one second electromagnetic coil in the second electromagnetic unit is distributed at a central region of the backboard, and
each of the central region of the grating panel and the central region of the backboard corresponds to an active area of the display panel.

10. The display device according to claim 7, wherein:
a first portion of the at least one first electromagnetic coil is distributed at a peripheral region of the grating panel and a second portion of the at least one first electromagnetic coil is distributed at a central region of the grating panel, and
a first portion of the at least one second electromagnetic coil is distributed at a peripheral region of the backboard and a second portion of the at least one second electromagnetic coil is distributed at a central region of the backboard.

11. The display device according to claim 1, wherein:
the first electromagnetic unit and the second electromagnetic unit have a same configuration.

12. The display device according to claim 6, wherein:
the at least one second electromagnetic coil and the at least one first electromagnetic coil have a same configuration.

13. The display device according to claim 7, further comprising:
a frame containing the backboard, the display panel, and the grating panel, wherein:
the frame has inner sidewalls configured with tracks, and
the grating panel contains sliding parts corresponding to the tracks, such that the sliding parts slide along the tracks in the direction perpendicular to the display panel for the grating panel to move towards or away from the display panel.

14. The display device according to claim 13, further comprising: at least one stretchable part, wherein:
one end of the stretchable part is fixed on the backboard and another end of the stretchable part is connected to the grating panel,
the stretchable part stretching along the direction perpendicular to the display panel for the grating panel to move towards or away from the display panel.

15. The display device according to claim 1, wherein:
the grating panel is a liquid crystal switching panel,
the grating panel includes a first glass substrate, a second glass substrate, and a liquid crystal layer between the first and second glass substrates,
a first electrode layer is on a side of the first glass substrate, a second electrode layer is on a side of the second glass substrate,
the first electrode layer and the second electrode layer each includes a plurality of stripe-shaped electrodes uniformly distributed on the first electrode layer and the second electrode layer, respectively, and
the stripe-shaped electrodes in the first electrode layer are aligned corresponding to the stripe-shaped electrodes in the second electrode layer.

16. A method of using a display device, comprising:
providing the display device comprising a display panel, a grating panel over the display panel, and a distance adjusting mechanism including a first electromagnetic unit configured with the grating panel and a second electromagnetic unit configured under the display panel, the distance adjusting mechanism comprising a first electromagnetic unit configured with the grating panel, the first electromagnetic unit comprising at least one first electromagnetic coil, and the first electromagnetic coil comprising multiple layers of coil material arranged along a direction perpendicular to a surface of the grating panel; and
controlling a first electric current flowing through the first electromagnetic unit and controlling a second electric current flowing through the second electromagnetic unit, to allow the grating panel to move towards or away from the display panel and provide an adjustable optimum viewing distance there-between.

17. The method according to claim 16, wherein controlling the first electric current flowing through the first electromagnetic unit and controlling the second electric current flowing through the second electromagnetic unit include:
controlling a magnetic force generated between the first electromagnetic unit and the second electromagnetic unit, by controlling one or more of a current amount, a current intensity, and a current direction of each of the first electric current and the second electric current, wherein:
when the first electric current and the second electric current have a same current direction, the grating panel moves towards the display panel, and
when the first electric current and the second electric current have opposite current directions, the grating panel moves away from the display panel.

18. The method according to claim 16, wherein:
each of the first electromagnetic unit and the second electromagnetic unit is configured in a region corresponding to one or more of a peripheral region and a central region of the display panel.

19. The method according to claim 16, wherein the display device further includes a frame containing the display panel and the grating panel, wherein:
the frame has inner sidewalls configured with tracks, and
the grating panel contains sliding parts corresponding to the tracks, such that the sliding parts slide along the tracks in a direction perpendicular to the display panel for the grating panel to move towards or away from the display panel.

20. The method according to claim 16, wherein:
each of the first electromagnetic unit and the second electromagnetic unit includes at least one electromagnetic coil,
each electromagnetic coil includes multiple layers of coil material arranged along a direction perpendicular to the display panel,
each layer of coil material in each electromagnetic coil includes a head-end, a tail-end, and a gap between the head-end and the tail-end,
gaps formed by the multiple layers in each electromagnetic coil are arranged in a staggered configuration, and
a head-end of one layer of coil material is electrically connected to a tail-end of an adjacent layer of coil material in each electromagnetic coil through a contact via.

* * * * *